United States Patent [19]

Fujioka et al.

[11] Patent Number: 4,800,327
[45] Date of Patent: Jan. 24, 1989

[54] THREE-PHASE INDUCTION MOTOR CONTROL METHOD

[75] Inventors: Yoshiki Fujioka, Higashiyamato; Shinichi Kouno, Hino, both of Japan

[73] Assignee: Fanuc Ltd, Yamanashi, Japan

[21] Appl. No.: 2,405

[22] PCT Filed: Apr. 15, 1986

[86] PCT No.: PCT/JP86/00187
  § 371 Date: Dec. 15, 1986
  § 102(e) Date: Dec. 15, 1986

[87] PCT Pub. No.: WO86/06227
  PCT Pub. Date: Oct. 23, 1986

[30] Foreign Application Priority Data
  Apr. 16, 1985 [JP] Japan .................... 60-79257

[51] Int. Cl.$^4$ ............................................. H02P 5/40
[52] U.S. Cl. .................................. 318/798; 318/806; 318/811
[58] Field of Search ............... 318/811, 798, 806, 803; 363/41

[56] References Cited

U.S. PATENT DOCUMENTS

| | | | |
|---|---|---|---|
| 4,047,083 | 9/1977 | Plunkett | 318/806 |
| 4,480,299 | 10/1984 | Muto et al. | 318/811 |
| 4,587,605 | 5/1986 | Kouyama et al. | 318/811 |
| 4,672,287 | 6/1987 | Fujioka | 318/800 |
| 4,680,525 | 7/1987 | Kobari et al. | 318/806 |

FOREIGN PATENT DOCUMENTS 49693 5/1981 Japan .

Primary Examiner—David Smith, Jr.
Attorney, Agent, or Firm—Staas & Halsey

[57] ABSTRACT

A three-phase induction motor control method according to the present invention subjects a three-phase induction motor to vector control by an output from an inverter which is supplied with a direct current obtained by conversion from an AC input. The method includes sensing a DC-converted voltage at a DC link section, varying a flux command in dependence upon the sensed DC voltage, and controlling the motor to obtain a constant output irrespective of a fluctuation in power supply voltage.

12 Claims, 5 Drawing Sheets

Fig. 2

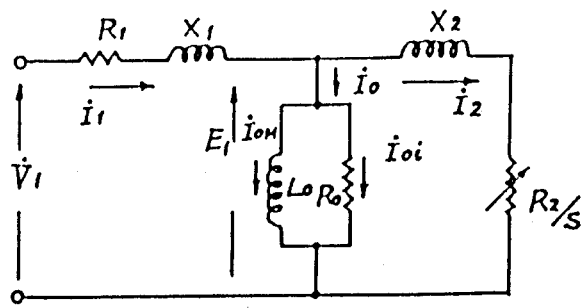

- $\dot{V}_1$ : TERMINAL VOLTAGE
- $\dot{I}_1$ : PRIMARY CURRENT
- $R_1$ : PRIMARY RESISTANCE
- $X_1$ : PRIMARY REACTANCE
- $E_1$ : PRIMARY INDUCED VOLTAGE
- $\dot{I}_0$ : EXCITATION CURRENT
- $R_0$ : EXCITATION RESISTANCE
- $L_0$ : EXCITATION REACTANCE
- $\dot{I}_2$ : SECONDARY CURRENT
- $X_2$ : SECONDARY REACTANCE
- $R_2$ : SECONDARY RESISTANCE
- $S$ : SLIP

Fig. 3

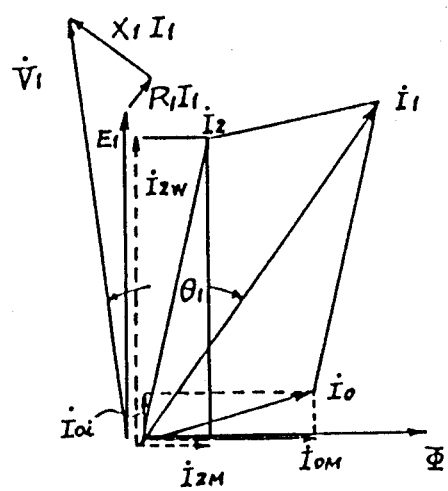

- $\Phi$ : FLUX
- $\dot{I}_{0M}$ : MAGNETIZATION CURRENT
- $\dot{I}_{0i}$ : CORE LOSS CURRENT
- $\theta_1$ : PRIMARY POWER FACTOR $V_{dc}$: CREST VALUE
$V_{ac}$: EFFECTIVE VALUE

AMPLITUDE RATIO A/B

THREE-PHASE INDUCTION MOTOR CONTROL METHOD

DESCRIPTION

BACKGROUND OF THE INVENTION

This invention relates to a three-phase induction motor control method in which the output is controlled so as to be constant by sensing fluctuations in power supply voltage.

Recent control of three-phase induction motors is in many cases performed through either of the following methods:

(1) a method of controlling the frequency and voltage of the motor power supply by an inverter, or
(2) a vector control method of controlling the instantaneous value of motor stator current and generating a torque equivalent to that of a shunt DC machine.

Since the output of an induction motor generally varies in proportion to the square of the voltage impressed upon the motor, the output will fluctuate when the AC input voltage undergoes a large variation, irrespective of whether the inverter method or vector control method is employed. Countermeasures devised in order to prevent such a fluctuation in output include varying inverter control pulse widths in dependence upon the AC input voltage in the inverter method and varying the amount of maximum slip in dependence upon the AC input voltage in the vector control method. Nevertheless, satisfactory results are not obtained in terms of holding the output of the induction motor constant.

SUMMARY OF THE INVENTION

The present invention has been devised to solve the aforementioned problem of the prior art and an object is to provide a three-phase induction motor control method in which the output is controlled so as to be constant, even if there is a fluctuation in power supply voltage, by sensing a DC voltage, which is converted from an AC input, as the voltage of a DC link section, and by varying a flux command to deal with this voltage.

The three-phase induction motor control method of the present invention includes a step for sensing voltage at a DC link section which converts an AC input voltage into a direct current; a step, implemented when the input voltage is low, for increasing a flux command above a base velocity and raising the amplitude of a signal, output by a pulse width modulation (PWM) circuit, with respect to a triangular wave, thereby raising motor terminal voltage, and a step, implemented when the input voltage is high, for decreasing the flux command from a region below the base velocity and reducing the amplitude of the PWM circuit signal with respect to the triangular wave, thereby lowering motor terminal voltage.

Thus, in accordance with the present invention, the output of the induction motor is controlled so as to be constant in an ordinary vector control-type control circuit, even when there is a variation in the AC input voltage. Further, according to the invention, the output of the induction motor can be held constant even if the input voltage fluctuates by ±10% of the rated input voltage.

BRIEF DESCRIPTION OF THE DRAWINGS

FIG. 2 is an equivalent circuit of one phase of a three-phase induction motor, FIG. 3 is a vector diagram showing the relationship of elements of a three-phase induction motor.

DETAILED DESCRIPTION OF THE PREFERRED EMBODIMENT

An embodiment of the present invention will now be described in detail with reference to the drawings.

Figure 1:
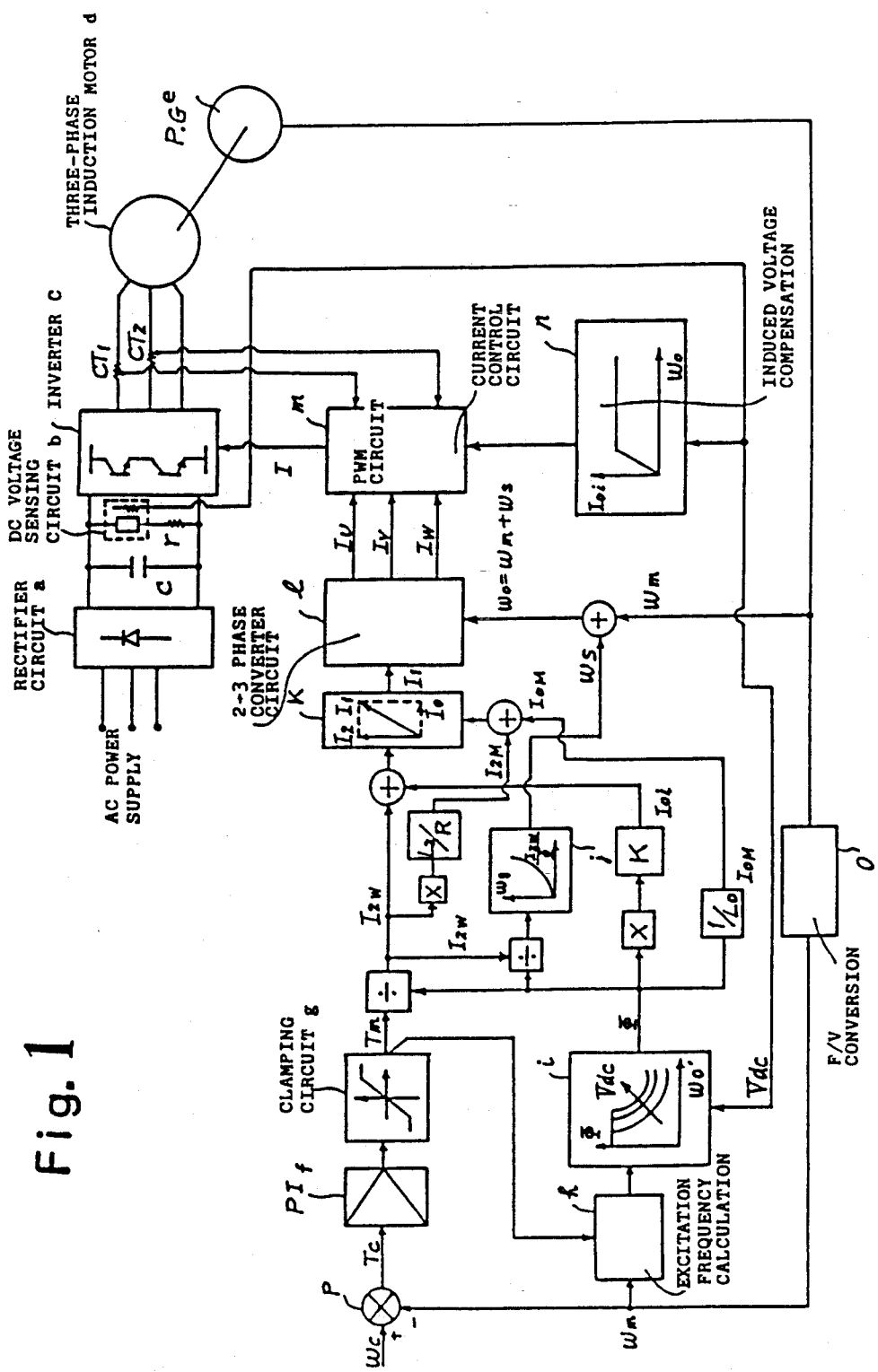
FIG. 1 is a control block diagram illustrating an embodiment of the present invention as applied to vector control of a three-phase induction motor.

FIG. 1 is a control block diagram in which an embodiment of the present invention is applied to vector control of a three-phase induction motor, where the pulse-width is controlled by a PWM circuit.

Before describing the arrangement shown in FIG. 1, let us refer to FIGS. 2 through 6 to describe the principles on which the present invention is premised.

Figure 4:
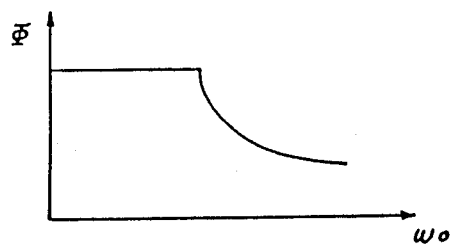
FIGS. 4 through 9 are views for explaining various characteristics of the present invention.
Figure 5:
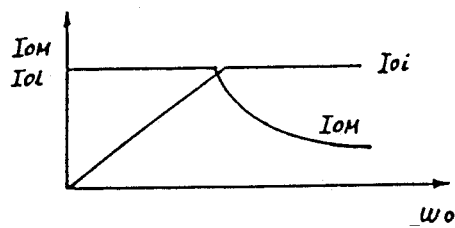

FIG. 2 is an equivalent circuit of one phase of a three-phase induction motor including primary resistance $R_1$, primary reactance $X_1$, terminal voltage $V_1$ and secondary resistance divided by slip $R_2/S$., FIG. 3 is a vector diagram showing the relationship of various elements of a three-phase induction motor, and FIGS. 4 and 5 are views for explaining characteristics of the present invention. Vector control of a three-phase induction motor is performed in accordance with an operating sequence of the following kind:

(1) A velocity command $\omega_c$ is set.
(2) Motor velocity $\omega_m$ is sensed.
(3) A torque command $T_c$ is obtained by performing a subtraction between $\omega_c$ and $\omega_m$.
(4) An estimated value $\omega'_s$ of slip is obtained as follows:

$$\omega'_s = K_0 \times T_c \times \omega_m$$

($K_0$ is a constant)

(5) An estimated value $\omega'_0$ of excitation frequency is obtained as follows:

$$\omega'_0 = \omega_m + \omega'_s$$

(6) A flux $\Phi$ corresponding to the excitation frequency $\omega'_0$ is obtained from the characteristic diagram of FIG. 4.
(7) Winding resistance measurement, a no-load test and a lock test are carried out and values of primary induction voltage $E_1$ and the core loss current component $I_{0i}$ of the excitation current $I_0$ are found from the equivalent circuit of FIG. 2, and values of magnetization current $I_{0M}$, excitation resistance $R_0$ and excitation reactance $L_0$ are found from the vector diagram of FIG. 3.
(8) A revolving coordinate system is transformed into a fixed coordinate system, with the flux $\Phi$ of the revolving field serving as a reference phase. More specifically, excitation current $I_0$ is obtained as follows by taking the vector sum between a component $I_{0M}$ along the $\Phi$ axis and a component $I_{0i}$ along the $E_1$ axis:

$$\dot{I}_0 = \dot{I}_{0M} + \dot{I}_{0i}$$

Similarly, secondary current $I_2$ is obtained as follows by taking the vector sum between a component $\dot{I}_{2M}$ along the $\Phi$ axis and a component $\dot{I}_{2\omega}$ along the $E_1$ axis:

$$\dot{I}_2 = \dot{I}_{2M} + \dot{I}_{2\omega}$$

The flux $\Phi$ is obtained as $$\Phi = L_0 \cdot \dot{I}_{0M}$$

from $$E_1 = d\Phi/dt = L_0 \times (d\dot{I}_{0M}/dt)$$
$$= d(L_0 \cdot \dot{I}_{0M})/dt$$

Therefore, the $\Phi$-axis component $\dot{I}_{0M}$ of excitation current $\dot{I}_0$ and the $E_1$-axis component $\dot{I}_{0i}$ are obtained from the characteristic diagram of FIG. 5 and from $$\dot{I}_{0M} = \Phi/L_0$$

$$I_{0i} = K\omega_0 \Phi$$

(K is a constant)
(9) The $E_1$-axis component $\dot{I}_{2w}$ of secondary current $\dot{I}_2$ is obtained from $$I_{2w} = (T_c/\Phi)$$

Figure 6:
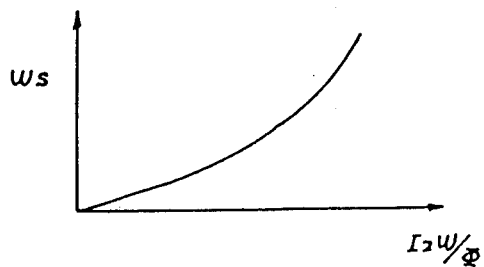

(10) The slip frequency $\omega_s$ is determined from the characteristic diagram of FIG. 6, as illustrated by reference numeral "j" in FIG. 1.

(11) The $\Phi$-axis component $\dot{I}_{2M}$ of the secondary current $\dot{I}_2$ is obtained from $$\dot{I}_{2M} = I_{2w} \times \omega_s \times (L_2/R_2)$$

(12) The component of primary current $\dot{I}_1$ in the $\Phi$ direction is obtained from $$I_1(\Phi) = I_{0M} + I_{2M}$$

(13) The component of primary current $\dot{I}_1$ in the $E_1$ direction is obtained from $$I_1(E_1) = I_{0i} + I_{2w}$$

(14) The excitation frequency $\omega_0$ is obtained from $$\omega_0 = \omega_m + \omega_s$$

Returning to the block diagram of FIG. 1, let us describe circuitry for controlling a motor "d".

A rectifier circuit a is connected to an AC power supply to obtain a DC voltage applied to an inverter "c". A DC voltage sensing circuit "b", the details of which are described below, is connected to this DC link circuit. The output voltage of the inverter "c" is pulse-width controlled by a PWM circuit/current control circuit "m" before being impressed upon a three-phase induction motor "d".

The velocity command $\omega_c$ and the induction motor velocity $\omega_m$, which is obtained, via a frequency/voltage (F/V) converter "o", from a voltage signal detected by a tachogenerator (PG) "e", are input to a comparator "p" to obtain the torque command $T_c$ as a difference signal voltage. The torque command $T_c$ is corrected via a proportional integrator (PI) "f" and a clamping circuit "g" to form an actual motor torque command $T_m$ which is input to an excitation frequency motor calculation circuit "h". Thereafter, the primary current $I_1$ is output from vector summing circuit "k" and excitation frequency $\omega_0$ is output from an adder on the basis of the above-described operating sequence (4)–(14). Primary current $I_1$ and excitation frequency $w_0$ are applied to a 2-to-3 phase converter circuit "l". The 2-to-3 phase converter circuit "l" converts orthogonal two-phase currents into three-phase currents to form current commands Iu, Iv, Iw in the respective three phases, these commands being applied to the PWM circuit/current control circuit "m". The input current signals to the motor "d" are fed back to the circuit m by CT1, CT2 to be compared with the current commands Iu, Iv, Iw output by the 2-to-3 phase converter circuit "l", whereby the circuit "m" delivers a commanded current I in each phase to the inverter "c".

Described next will be the operation of the DC voltage sensing circuit "b", which is an embodiment of the present invention. If a triangular wave is formed by a triangular wave generating circuit, not shown, within the PWM circuit and the triangular wave is applied to the circuit "m", then the output voltage of the PWM circuit/current control circuit "m" will differ depending upon the degree to which the triangular wave is utilized, considering the relationship between a voltage command and the actual terminal voltage of the motor.

Figure 7:
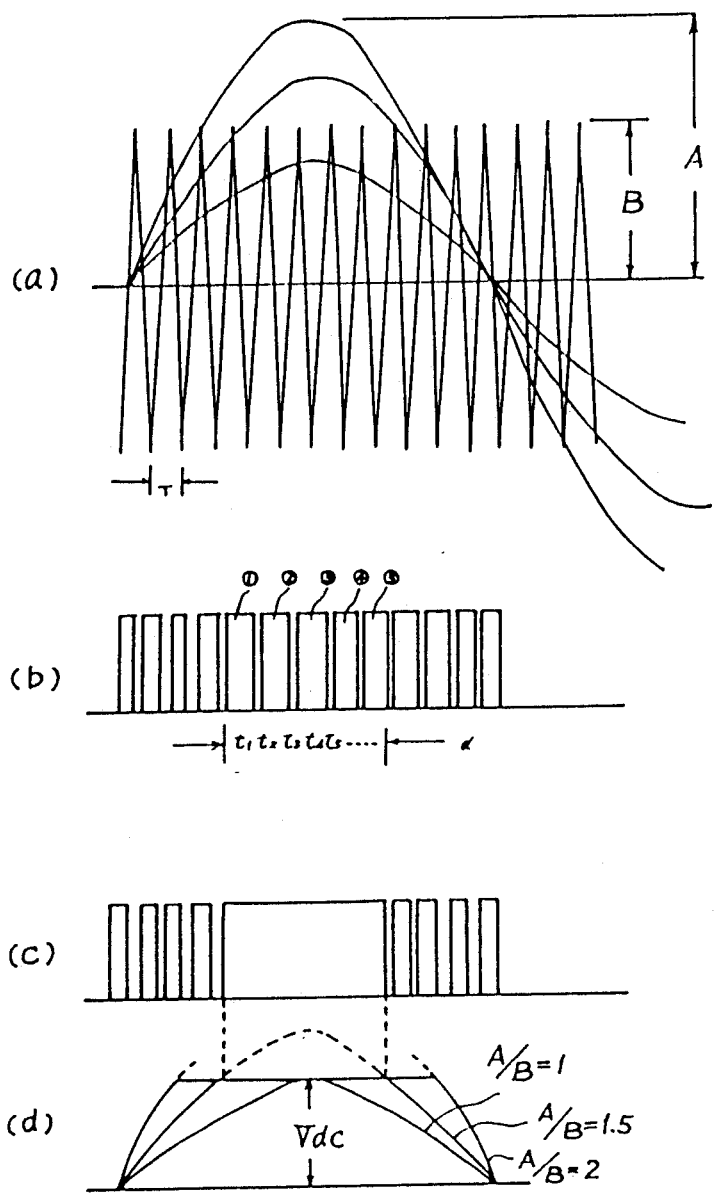
Figure 8:
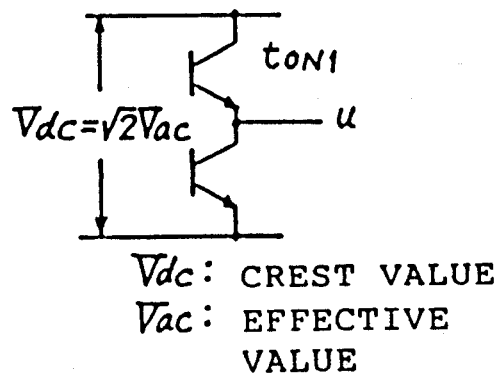

Let B represent the amplitude of the triangular wave applied to the PWM circuit/current control circuit "m", and let A represent the amplitude of the PWM command signal, as shown in FIG. 7(a). If the amplitude ratio A/B is less than 1, then the output voltage $V_u$ from a point "u" produced by turning on one transistor of the inverter "c", as shown in FIG. 8, is as follows:

$$V_u = (T_{ON1}/T) \times \sqrt{2}\, V_{ac} \{(1 + \sin\theta)/2\}$$

where T represents the period of the triangular wave. The line voltage across u-v applied to the motor "d" is $$V_{u-v} = (T_{ON1}) \times \sqrt{2}\, V_{ac} \times \{\sqrt{3}\, \cos(0-60°)/2\}$$

Expressing this as an effective value gives us $$V_{u-v} = (A/B) \times \sqrt{2}\, V_{ac} \times \{(\sqrt{3}\,/2)/\sqrt{2}\}$$
$$= (T_{ON1}/T) \times V_{dc} \times (\sqrt{3}\,/2) \times (1/\sqrt{2})$$

where
Vac: effective value
Vdc: set value (DC voltage)

More specifically, the effective value $V_{u-v}$ is determined by the period T of the triangular wave, the ON period $T_{ON1}$ of one transistor of the inverter and the DC voltage Vdc. It will be understood that if the PWM command signal A is increased in magnitude to enlarge the flux command $\Phi$ in a case where the DC voltage Vdc drops, then the motor terminal voltage will increase and a constant output will be obtained.

Next, let us consider control by a base signal of the transistor constituting the inverter "c" for a case where the amplitude ratio A/B is greater than 1. As shown in FIG. 7(b), there is a method in which the base signal of Tr in the inverter is turned off whenever the amplitude ratio (A/B) exceeds 1. However, this method involves certain problems, namely the fact that the output voltage will not rise, switching loss is great, etc.

Specifically, since there are a large number of switching operations, as at $t_1, t_2, t_3, \ldots$, in a time period $a$ over which the amplitude ratio (A/B) is greater than 1, switching loss is great. In addition, the output voltage in this time period takes on the average value of ①-⑤, as a result of which an increase is suppressed.

Figure 9:
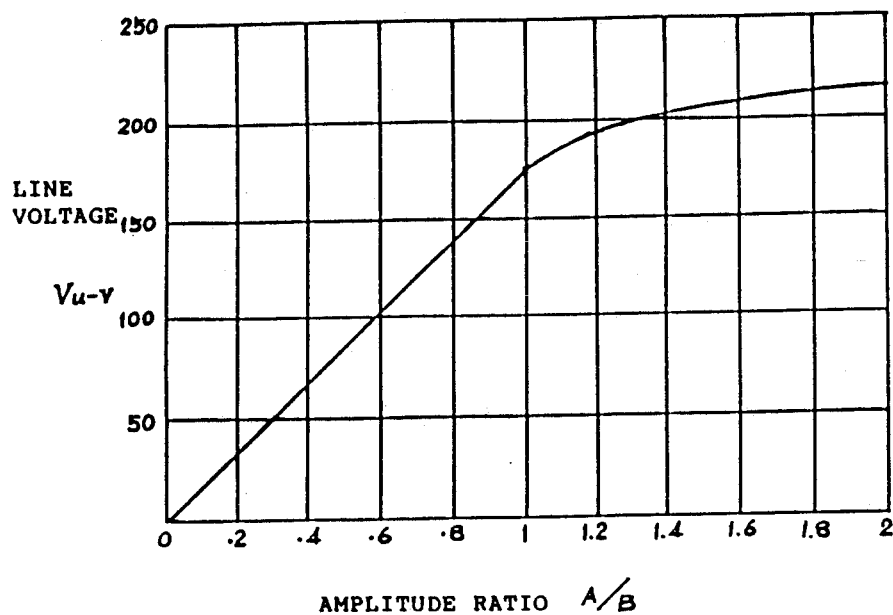

FIG. 9 illustrates the manner in which the line voltage $V_{u-v}$ varies with respect to the amplitude ratio A/B.

In the present invention, the new embodiments and features are illustrated by turning all the transistors Tr on, as shown in FIGS. 7(c), (d), in a range where the amplitude A of the PWM command signal exceeds the amplitude B of the triangular wave applied to the circuit "m". In other words, when the DC voltage is low, the flux command $\Phi$ above a base velocity is increased, the amplitude of the PWM circuit with respect to the triangular wave is raised, and the terminal voltage of the motor "d" is raised to obtain a constant output. When the DC voltage is high, the flux command $\Phi$ is decreased from a region below the base velocity, the amplitude of the PWM command signal with respect to the triangular wave is reduced, and the terminal voltage of the motor is lowered to obtain a constant output. As shown in the block diagram of FIG. 1, such control is performed by inputting the sensed voltage $V_{dc}$ of the DC voltage sensing circuit "b" to a data map "i" indicating the relationship between excitation frequency $\omega_0$ and flux $\Phi$, and correcting the flux $\Phi$ in dependence upon the DC voltage $V_{dc}$.

It should be noted that the DC voltage $V_{dc}$ sensed by the DC voltage sensing circuit "b" is also applied to an induced voltage compensating circuit "n". Here the induced voltage $E_1$ is expressed by $$E_1 = d\Phi/dt = L_0 \times (d\dot{I}_{0M}/dt)$$
$$= d(L_0 \cdot \dot{I}_{0M})dt$$

from the process of step (8), (9), as described above. Though this is expressed as a function of the magnetization current $\dot{I}_{0M}$, the latter may be expressed $$\dot{I}_{0M} = \dot{I}_0 - \dot{I}_{0i}$$

where $\dot{I}_0$ is the excitation current and $\dot{I}_{0i}$ the core loss current. Accordingly, the induced voltage is influenced by the core loss current $\dot{I}_{0i}$ due to these relationships. Therefore, the influence of the core loss current $I_{0i}$ is compensated for in the induced voltage compensating circuit so that the current I in each phase output by the PWM circuit/current control circuit "m" is obtained correctly.

In accordance with the three-phase induction motor control method of the present invention, output can be controlled so as to be constant even if there is a fluctuation in the voltage applied to the three-phase induction motor. It is possible for the three-phase induction motor control method of the present invention to have all processing executed by software using a high-speed processor. Although certain preferred embodiments have been shown and described it should be understood that many changes and modifications can be made therein without departing from the scope of the appended claims.

What is claimed is:

1. A three-phase induction motor control method for vector control of a three-phase induction motor by an output from an inverter to which is applied a direct current obtained by conversion from an AC input, said method comprising the steps of:
   (a) sensing voltage at a DC link section which converts the AC input voltage into the direct current;
   (b) increasing a flux command above a base velocity and raising an amplitude of a PWM current control circuit signal with respect to a triangular wave applied to the PWM circuit to raise motor terminal voltage, when the voltage of the DC link section, which is proportional to said AC input voltage, is low compared to desired motor terminal voltage;
   (c) decreasing the flux command from a region below the base velocity and reducing the amplitude of the PWM circuit signal with respect to said triangular wave to lower the motor terminal voltage, when the voltage of the DC link section, which is proportional to said input AC voltage, is high compared to desired motor terminal voltage.

2. A three-phase induction motor control system for controlling an input current to a three-phase induction motor, comprising:
   first means, operatively connectable to said motor, for receiving and converting a three-phase AC input voltage to a DC voltage, for sensing a motor velocity and said input current, and for converting said DC voltage into three-phase AC output voltage in accordance with a commanded current drive signal for application to said three-phase induction motor;
   second means operatively connected to said first means, for receiving a velocity command, for processing said sensed motor velocity and said sensed DC voltage and said velocity command, and for providing a flux command and a torque command each varying in accordance with said sensed motor velocity, said sensed DC voltage and said velocity command;
   third means, operatively connected to said second means, for receiving and processing said flux command and said torque command, for providing a slip frequency value, an excitation current value and a secondary current value, each varying in accordance with said flux command and said torque command; and
   fourth means, operatively connected to said third means, for receiving and processing said sensed DC voltage and said sensed inut current, said slip frequency value, said excitation current value and said secondary current value, and for providing said commanded current drive signal varying in accordance with said sensed DC voltage and said sensed input current.

3. A three-phase induction motor control system according to claim 2, wherein said first means includes rectifying means for converting said three-phase AC input voltage to said DC voltage.

4. A three-phase induction motor control system according to claim 3, wherein said first means includes a DC voltage sensing means for sensing said DC voltage and for providing said sensed DC voltage.

5. A three-phase induction motor control system according to claim 4, wherein said first means includes inverting means for converting said DC voltage to said three-phase AC output voltage.

6. A three-phase induction motor control system according to claim 5, wherein said first means includes a velocity sensing means for sensing said motor velocity and for providing said sensed motor velocity.

7. A three-phase induction motor control system according to claim 6, wherein said second means includes means for providing a torque command, by comparing, integrating and processing said velocity command and said sensed motor velocity.

8. A three-phase induction motor control system according to claim 7, wherein said second means includes means for calculating an excitation frequency value in accordance with said velocity command and said sensed motor velocity.

9. A three-phase induction motor control system according to claim 8, wherein said second means includes means for calculating a flux command varying in accordance with said excitation frequency value and said sensed DC voltage.

10. A three-phase induction motor control system according to claim 9, wherein said excitation current value includes at least two components and said fourth means includes means for storing a predetermined relationship between said excitation frequency value and a component of said excitation current value, and varying said commanded current drive signal in accordance with said predetermined relationship.

11. A three-phase induction motor control system according to claim 10, wherein said fourth means includes means for providing said commanded current drive signal varying in accordance with said slip frequency value, said excitation current value, said secondary current value and said sensed input current.

12. A three-phase induction motor control system for controlling an input current to a three-phase induction motor, comprising:

input current sensing means for sensing said input current of said motor and for providing input current control signals based upon said input current to said motor;

rectifying means for receiving a three-phase AC input voltage and for converting said three-phase AC input voltage to a DC voltage;

inverting means for converting said DC voltage into a three-phase AC output votlage in accordance with a commanded current drive signal;

DC voltage sensing means for sensing said DC voltage and for providing a DC voltage control signal;

velocity sensing means for sensing a velocity of said motor and for providing a motor velocity control signal based upon said sensed velocity;

means for receiving a velocity command and for providing a torque command, by comparing, integrating and processing said velocity command and said sensed motor velocity control signal;

means for calculating an excitation frequency value in accordance with said velocity command and said sensed motor velocity control signal;

means for calculating a flux command varying in accordance with said sensed DC voltage control signal and said excitation frequency value;

means for receiving and processing said flux command and said torque command, for providing a slip frequency value, an excitation current value, which includes at least two components, and a secondary current value, each varying in accordance with said flux command and said torque command;

means for storing a predetermined relationship between said excitation frequency value and a component of said excitation current value, and varying said commanded current drive signal in accordance with said predetermined relationship; and means for providing said commanded current drive signal, based upon the values of said slip frequency, said excitation current value, said secondary current value and said sensed input current control signals.

* * * * *